June 28, 1927.
N. SOLIANI
1,634,220
INTERNAL STRUCTURE FOR LARGE SUBMARINES WITH TWIN SCREW PROPELLERS
Filed April 10, 1924
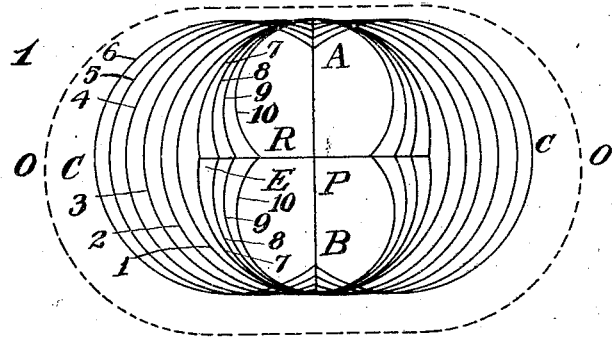
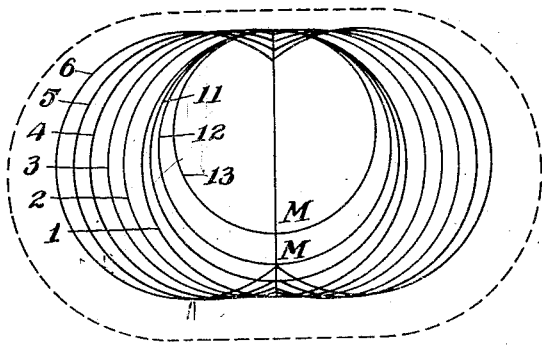
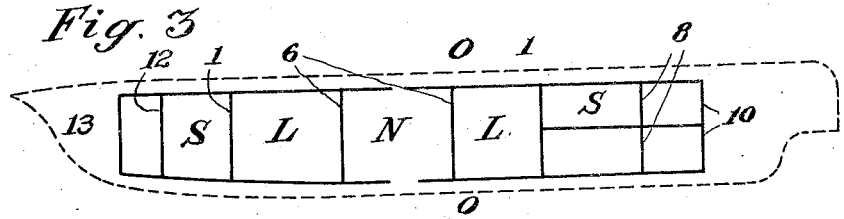
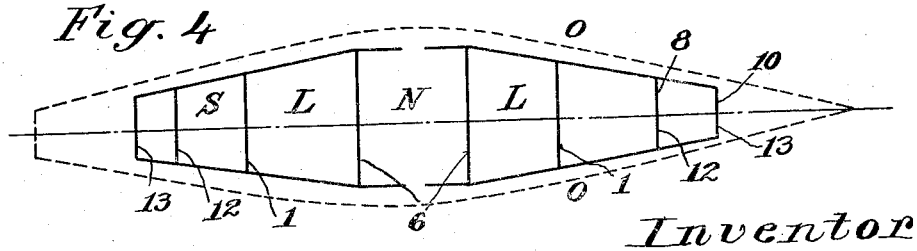
Inventor
N. Soliani,
By Marks Clerk
Attys.

Patented June 28, 1927.

1,634,220

UNITED STATES PATENT OFFICE.

NABOR SOLIANI, OF GENOA, ITALY, ASSIGNOR TO "ANSALDO" SOCIETA ANONIMA, OF GENOA, ITALY.

INTERNAL STRUCTURE FOR LARGE SUBMARINES WITH TWIN-SCREW PROPELLERS.

Application filed April 10, 1924, Serial No. 705,653, and in Italy April 13, 1923.

This invention relates to the internal structure of submarines, of the type in which the midships section of such internal structure consists of the partial peripheries of two different circles, the ends of such circular portions being connected to each other and to a connecting member so as to form two and only two compartments alongside one another.

The object of this invention is to construct an internal structure for naval submarines with twin screw propellers which shall be light and of small height and shall be adapted to withstand the external hydrostatic pressure and to house the machinery for driving the two propellers.

In submarines of the type first hereinbefore referred to, the connecting member joining the ends of the circular portions was constituted by a series of cross-ties. Such a connecting member was not adapted to sustain any appreciable thrust between the two ends of the circular portions, and the midships section was filled with air under pressure in order to resist the stresses tending to deform the vessel, while the driving machinery was housed in another part of the vessel.

It has also been proposed to construct a vessel in which the midships section consisted of two complete circles intersecting each other so as to form three compartments alongside one another, the points of intersection being also connected by tie rods, and the outside compartments being utilized for storage purposes or for the reception of machinery.

The present invention consists in an improved internal structure for submarines of the type first hereinbefore referred to, in which the connecting member joining the ends of the circular portions is constructed so as to be capable of withstanding appreciable thrust, while the two compartments are used for housing the machinery for driving twin-screw propellers.

A constructional form of a naval submarine with twin screw propellers according to the present invention is diagrammatically indicated in the accompanying drawings, in which Fig. 1 shows various cross sections of the ship, taken at different points of its length, Fig. 2 shows various cross-sections of a slightly modified form of ship, taken at different points of its length, Fig. 3 is an elevation of the ship corresponding to the Figs. 1 and 2, Fig. 4 is a plan of the ship, corresponding either to Fig. 1 or to Fig. 2.

In the drawings, the full lines represent the internal structure, while the dotted lines indicate the external hull of the submarine.

The transverse section of the internal structure corresponding to the space N consists of the partial peripheries of two different circles (indicated by 6 in Figs. 1 and 2) the ends of such partial peripheries being connected to each other at A and B (Fig. 1). These points A and B are also connected by a rigid metallic wall or by struts P. Such connection is capable of withstanding appreciable thrust. This space N is occupied by the propelling machinery, each of the circles referred to being of sufficient height to house the driving machinery for one of the two propellers. Such cylindrical structure refers only to the said space N or a little more.

On both sides of this space N towards the stem and the stern, the structure, though remaining of the same height, tapers horizontally to follow the lines O of the hull. This is easily obtained as regards the compartments LL by shifting the centers of the circles towards one another till they coincide, the figure then becoming a single circle 1 whose diameter is equal to that of the circular parts 6. The circular portions 5, 4, 3, 2 indicate sections of the compartments LL at intermediate points.

It should be noted that the internal structure of the compartments L is a perfectly developable surface, which is thus of easy construction.

Towards the stern of the ship, aft of the single circle mentioned 1, the section may continue as of circular form (11, 12, 13 Fig. 2) of gradually decreasing diameter throughout the aft compartments S, thus constituting a cone. Towards the bow, in front of the single circle 1, the internal structure may also be of conical shape, the various sections being again indicated by 11, 12, 13 in Fig. 2.

Alternatively towards the bow, the sections of the internal structure may be constituted by two circular segments (7, 8, 9, 10 in Fig. 1) intersecting in a horizontal place R so that two chambers are formed, the lower chamber for the launching tubes, and the upper chamber either for the launching tubes or for other use.

Having now fully described the invention what is claimed as new and desired to be secured by Letters Patent is:

1. An improved internal structure for submarines of the character described, comprising a body composed of fore and aft sections, a uniform midship portion the cross section of which consists of the part peripheries of two intersecting circles, and the fore and aft portions of the body being tapered uniformly and having the cross section consisting of part peripheries of circles of the same diameter of the circles of the midship portions and with the centers of the circles approaching one another towards the end of the ship, thereby obtaining a perfectly developed surface.

2. In a naval military submarine, a twin circular body structure composed of two steel intersecting circular framed shells having the two points of intersection rigidly and fixedly connected in a manner to resist external pressure, the said twin circular body structure forming a parallel body amidship and tapering forward and aft by gradually nearing horizontally the centers of the two circular shells towards the middle longitudinal plane of the body along two converging straight lines meeting in a point where the two circular shells intersect in a single circle of the same diameter.

3. An improved internal structure for submarines of the character described, comprising a body composed of fore and aft portions, a uniform midship portion the cross section of which consists of part peripheries of two intersecting circles, the fore and aft portions of the body being tapered horizontally and having a cross section consisting of part peripheries of circles of the same diameter as the circles of the midship portion and with the centers of the circles approaching one another towards the end of the ship, thereby attaining a perfectly developed surface, and a connecting piece joining the intersecting ends of the circular portions for providing a pair of compartments for housing the machinery for driving the twin screw propellers and arranged to withstand appreciable thrusts, substantially as and for the purposes set forth.

4. An improved internal structure for submarines of the character described, comprising a body composed of fore and aft portions, the forward portion of the body having a cross-section consisting of part peripheries of two circles intersecting each other in a horizontal plane, the diameters of the circles increasing and their centers approaching one another towards the center of the ship, a uniform midship portion the cross section of which consists of the part peripheries of two intersecting circles, and a connecting piece joining the intersecting ends of the circular portions for providing a pair of compartments for housing the machinery for driving the twin screw propellers and arranged to withstand appreciable thrusts substantially as and for the purposes set forth.

In testimony whereof I have hereunto signed my name.

ING. NABOR SOLIANI.